US011966180B2

(12) United States Patent
Morita

(10) Patent No.: US 11,966,180 B2
(45) Date of Patent: Apr. 23, 2024

(54) IMAGE FORMING APPARATUS WITH ACTION MEMBER FOR MOVING HEATING UNIT FROM REFERENCE POSITION TO EVACUATION POSITION

(71) Applicant: KYOCERA Document Solutions Inc., Osaka (JP)

(72) Inventor: Takuro Morita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/180,604

(22) Filed: Mar. 8, 2023

(65) Prior Publication Data

US 2023/0288853 A1 Sep. 14, 2023

(30) Foreign Application Priority Data

Mar. 10, 2022 (JP) ................................ 2022-036972

(51) Int. Cl.
*G03G 15/20* (2006.01)
*G03G 21/16* (2006.01)

(52) U.S. Cl.
CPC ..... *G03G 15/2053* (2013.01); *G03G 15/2064* (2013.01); *G03G 21/1633* (2013.01); *G03G 21/1685* (2013.01); *G03G 2221/1639* (2013.01)

(58) Field of Classification Search
CPC ........... G03G 15/2053; G03G 15/2064; G03G 15/2032; G03G 21/6133; G03G 21/1685; G03G 2215/2003; G03G 2221/1639; G03G 21/1633
See application file for complete search history.

(56) References Cited

U.S. PATENT DOCUMENTS

| | | | | |
|---|---|---|---|---|
| 7,079,800 B2 * | 7/2006 | Asakura | G03G 15/2017 | 399/328 |
| 2006/0285893 A1 * | 12/2006 | Ishii | G03G 15/2039 | 399/329 |
| 2010/0178088 A1 * | 7/2010 | Koshida | G03G 15/2032 | 399/328 |

(Continued)

FOREIGN PATENT DOCUMENTS

JP 2021086093 A 6/2021

*Primary Examiner* — Arlene Heredia
*Assistant Examiner* — Laura Roth
(74) *Attorney, Agent, or Firm* — Alleman Hall & Tuttle LLP

(57) ABSTRACT

An action member is movable between a first position at which a unit bias member is sandwiched between the action member and a heating unit and a second position. A movement mechanism operates in conjunction with a movement of an operation portion to cause the action member to move from one of the first position and the second position to another one of the first position and the second position. A contact portion of the heating unit comes into contact with a fixing unit by a bias force received from the unit bias member when the action member is at the first position. The action member includes an engagement portion which engages with a part of the heating unit when the action member moves from the first position to the second position. The heating unit engages with the engagement portion to move from a reference position to an evacuation position.

5 Claims, 8 Drawing Sheets

(56) References Cited

U.S. PATENT DOCUMENTS

| | | | | |
|---|---|---|---|---|
| 2011/0150546 | A1* | 6/2011 | Koshida | G03G 15/2064 399/329 |
| 2012/0155918 | A1* | 6/2012 | Egi | G03G 15/2053 399/329 |
| 2021/0165352 | A1 | 6/2021 | Sato | |
| 2023/0195013 | A1* | 6/2023 | Izumichi | G03G 15/2035 |

* cited by examiner

IMAGE FORMING APPARATUS WITH ACTION MEMBER FOR MOVING HEATING UNIT FROM REFERENCE POSITION TO EVACUATION POSITION

INCORPORATION BY REFERENCE

This application is based upon and claims the benefit of priority from the corresponding Japanese Patent Application No. 2022-036972 filed on Mar. 10, 2022, the entire contents of which are incorporated herein by reference.

BACKGROUND

The present disclosure relates to an electrophotographic image forming apparatus including a heating unit and a fixing unit.

In the electrophotographic image forming apparatus, a toner image is transferred onto a sheet from an image-carrying member, and the toner image is fixed onto the sheet by a fixing device.

The fixing device may be sectioned into a heating unit including a heater and a fixing unit including a fixing member and a pressure roller. The heater heats the fixing member.

Further, the image forming apparatus is known to include a mechanism which causes the heating unit to move from a heating position to an evacuation position in conjunction with an operation to an operation portion. When the heating unit is evacuated to the evacuation position, the fixing unit can be drawn out from a main body.

SUMMARY

An image forming apparatus according to an aspect of the present disclosure includes a heating unit, a fixing unit, a unit bias member, an action member, and a movement mechanism. The heating unit includes a heater and is disposed along a first direction in a main body. The fixing unit includes a fixing member that is heated by the heater and a pressure member that biases a sheet toward the fixing member, and is disposed next to the heating unit along the first direction in the main body. The unit bias member is an elastic member disposed on a side opposite to a side of the fixing unit from the heating unit in the main body. The action member is disposed in the main body and is supported while being movable between a first position at which the unit bias member is sandwiched between the action member and the heating unit and a second position farther away from the fixing unit than the first position. The movement mechanism includes an operation portion capable of moving by being operated, and operates in conjunction with a movement of the operation portion to cause the action member to move from one of the first position and the second position to another one of the first position and the second position. The heating unit includes a contact portion which comes into contact with the fixing unit by a bias force received from the unit bias member when the action member is at the first position. The contact portion comes into contact with the fixing unit to position the heating unit at a reference position. The action member includes an engagement portion which engages with a part of the heating unit when the action member moves from the first position to the second position. When the action member moves from the first position to the second position, the heating unit engages with the engagement portion to move from the reference position to an evacuation position farther away from the fixing unit than the reference position. When the heating unit is at the evacuation position, the fixing unit can be drawn out from the main body along the first direction.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the attached drawings. It is noted that the following embodiment is an embodied example of the present disclosure and does not limit the technical scope of the present disclosure.

[Configuration of Image Forming Apparatus 10]

An image forming apparatus 10 according to the embodiment executes print processing using electrophotography. The print processing is processing of forming an image on a sheet 900.

Figure 1:
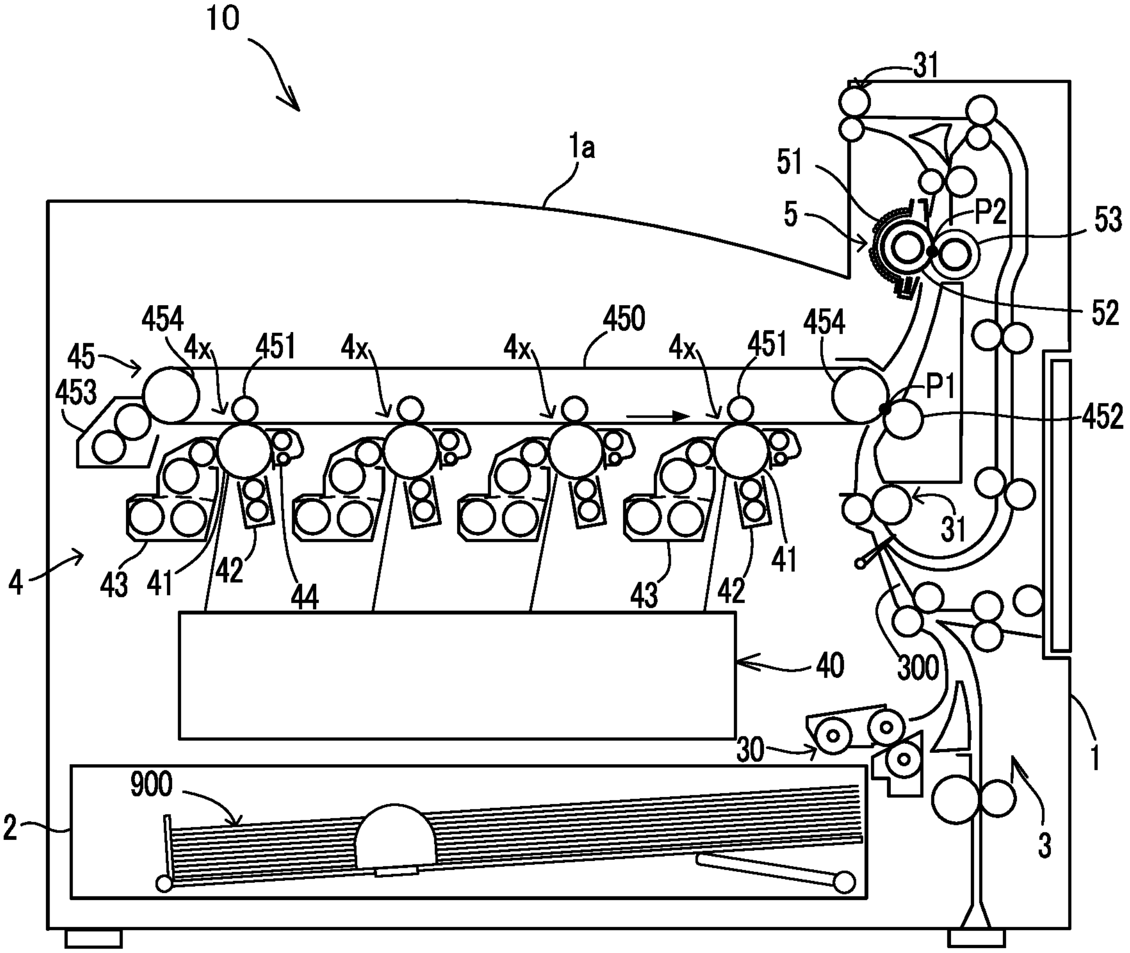
FIG. 1 is a configuration diagram of an image forming apparatus according to an embodiment.

As shown in FIG. 1, the image forming apparatus 10 includes a sheet storing portion 2, a sheet conveying device 3, and a printing device 4. The sheet conveying device 3 and the printing device 4 are housed in a main body 1 as a housing.

The sheet storing portion 2 is capable of storing a plurality of sheets 900. The sheet conveying device 3 includes a sheet feed device 30 and a plurality of conveying roller pairs 31.

The sheet feed device 30 feeds the sheets 900 in the sheet storing portion 2 one by one to a conveying path 300. The conveying path 300 is a path of the sheets 900.

The plurality of conveying roller pairs 31 convey the sheet 900 along the conveying path 300. One of the plurality of conveying roller pairs 31 discharge the sheet 900 formed with an image onto a discharge tray 1*a* from the conveying path 300.

The printing device 4 executes the print processing on the sheet 900 conveyed along the conveying path 300. The image to be formed on the sheet 900 is a toner image.

The printing device 4 includes a laser scanning unit 40, one or more image forming portions 4*x*, a transfer device 45, and a fixing device 5. The image forming portion 4*x* includes a photoconductor 41, a charging device 42, a developing device 43, and a drum cleaning device 44.

The charging device 42 charges a surface of the photoconductor 41. The laser scanning unit 40 scans beam light on the charged surface of the photoconductor 41. Thus, the laser scanning unit 40 forms an electrostatic latent image on the surface of the photoconductor 41.

By supplying toner to the surface of the photoconductor 41, the developing device 43 develops the electrostatic latent image into a toner image. The transfer device 45 transfers the toner image formed on the surface of the photoconductor 41 onto the sheet 900.

The transfer device 45 transfers the electrostatic latent image onto the sheet 900 at a transfer position P1 on the conveying path 300.

In the present embodiment, the printing device 4 is a tandem-type color printing device including a plurality of image forming portions 4*x*. Further, the transfer device 45 includes an intermediate transfer belt 450, a plurality of primary transfer devices 451, a secondary transfer device 452, and a belt cleaning device 453.

In the example shown in FIG. 1, the printing device 4 includes four image forming portions 4*x* respectively corresponding to toner of four colors, that is, yellow, magenta, cyan, and black. The transfer device 45 includes four primary transfer devices 451 respectively corresponding to the four image forming portions 4*x*.

The intermediate transfer belt 450 is rotatably supported by a plurality of supporting rollers 454. One of the plurality of supporting rollers 454 rotates by being driven by a belt drive device (not shown). Thus, the intermediate transfer belt 450 rotates.

Each of the primary transfer devices 451 transfers the toner image formed on the surface of the photoconductor 41 in the corresponding one of the image forming portions 4*x* onto a surface of the intermediate transfer belt 450. Thus, a synthetic toner image obtained by synthesizing the toner images of four colors is formed on the surface of the intermediate transfer belt 450.

The intermediate transfer belt 450 rotates while carrying the synthetic toner image. The secondary transfer device 452 transfers the synthetic toner image formed on the surface of the intermediate transfer belt 450 onto the sheet 900 at the transfer position P1.

The drum cleaning device 44 removes primary waste toner from the surface of the photoconductor 41. The primary waste toner is toner that remains on a part of the surface of the photoconductor 41, that has passed through the primary transfer device 451.

The belt cleaning device 453 removes secondary waste toner from the surface of the intermediate transfer belt 450. The secondary waste toner is toner that remains on a part of the surface of the intermediate transfer belt 450, that has passed through the secondary transfer device 452.

The fixing device 5 heats and pressurizes the synthetic toner image on the sheet 900 at a fixing position P2 on the conveying path 300. Thus, the fixing device 5 fixes the synthetic toner image onto the sheet 900. The fixing position P2 is a position on a downstream side of the transfer position P1 in a sheet conveying direction.

Figure 2:
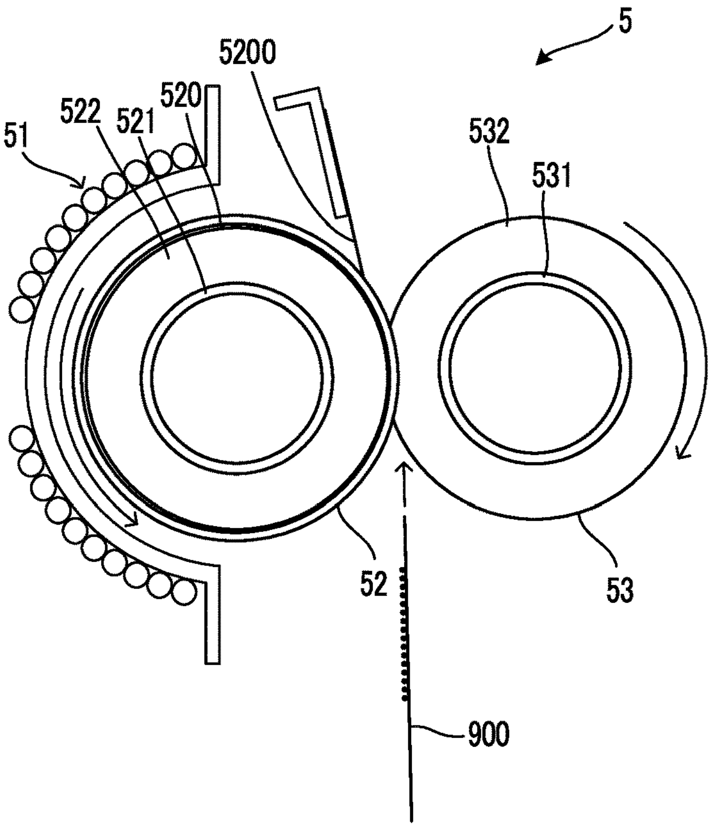
FIG. 2 is a diagram showing a configuration of a main portion of a fixing device in the image forming apparatus according to the embodiment.

As shown in FIG. 2, the fixing device 5 includes a heater 51, a fixing belt 52, a fixing roller 520, a pressure roller 53, and a sheet separation member 5200.

The fixing belt 52 is a flexible cylindrical member including the fixing roller 520 therein. The fixing belt 52 is heated by the heater 51.

The fixing roller 520 is a cylindrical member which supports the fixing belt 52 from an inner side of the fixing belt 52. The fixing roller 520 includes a cylindrical core metal portion 521 and an elastic portion 522 formed on an outer circumference of the core metal portion 521.

The fixing roller 520 is supported rotatably. The fixing belt 52 is capable of rotating with the fixing roller 520.

The fixing belt 52 includes a conductive base material, an elastic layer formed on an outer circumference of the base material, and a release layer formed on an outer circumference of the elastic layer.

The heater 51 is disposed so as to oppose an outer circumferential surface of the fixing belt 52. In the present embodiment, the heater 51 is a heating device that uses an induction heating system. The heater 51 mainly heats the base material of the fixing belt 52 by electromagnetic induction.

The pressure roller 53 is supported rotatably. Similar to the fixing roller 520, the pressure roller 53 also includes a cylindrical core metal portion 531 and an elastic portion 532 formed on an outer circumference of the core metal portion 531.

The pressure roller 53 rotates by being driven by a drive device (not shown). The fixing belt 52 and the fixing roller 520 rotate in conjunction with the pressure roller 53.

The fixing belt 52 heats the toner image formed on the sheet 900. The pressure roller 53 pressurizes the toner image toward the sheet 900.

It is noted that the fixing belt 52 is an example of a fixing member that is heated by the heater 51. The pressure roller 53 is an example of a pressure member that biases the sheet 900 toward the fixing belt 52.

The sheet separation member 5200 peels the sheet 900 off from the fixing belt 52 when the sheet 900 adheres onto the fixing belt 52.

Figure 4:
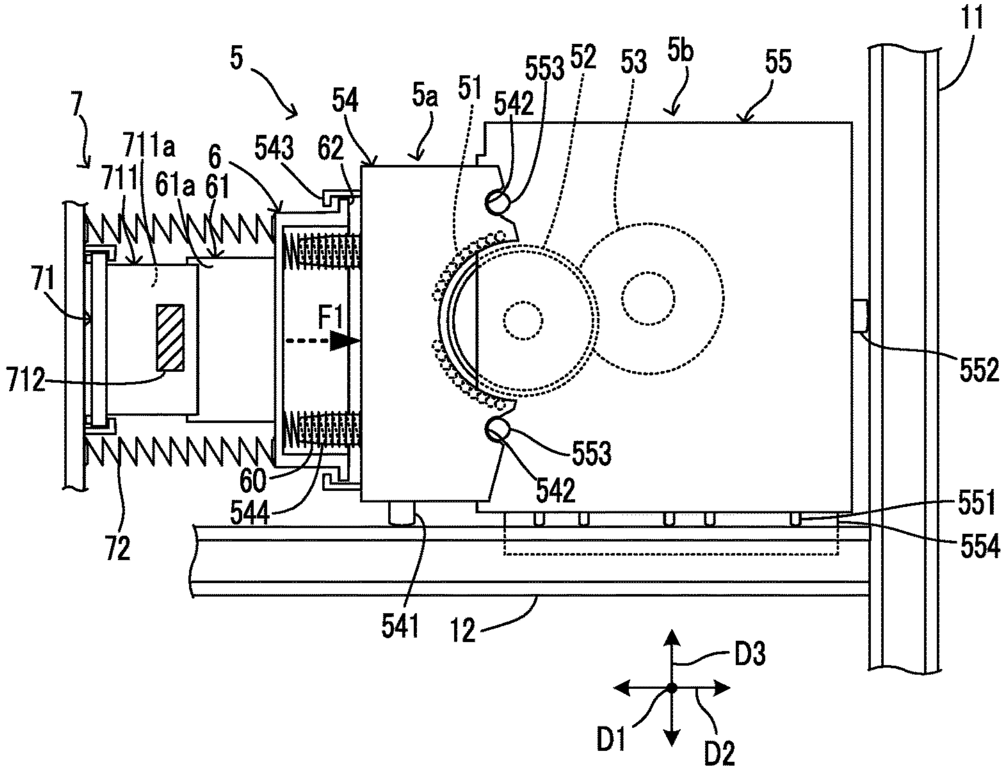
FIG. 4 is a front view of the fixing device and an interlocking mechanism in a biased state in the image forming apparatus according to the embodiment.
Figure 5:
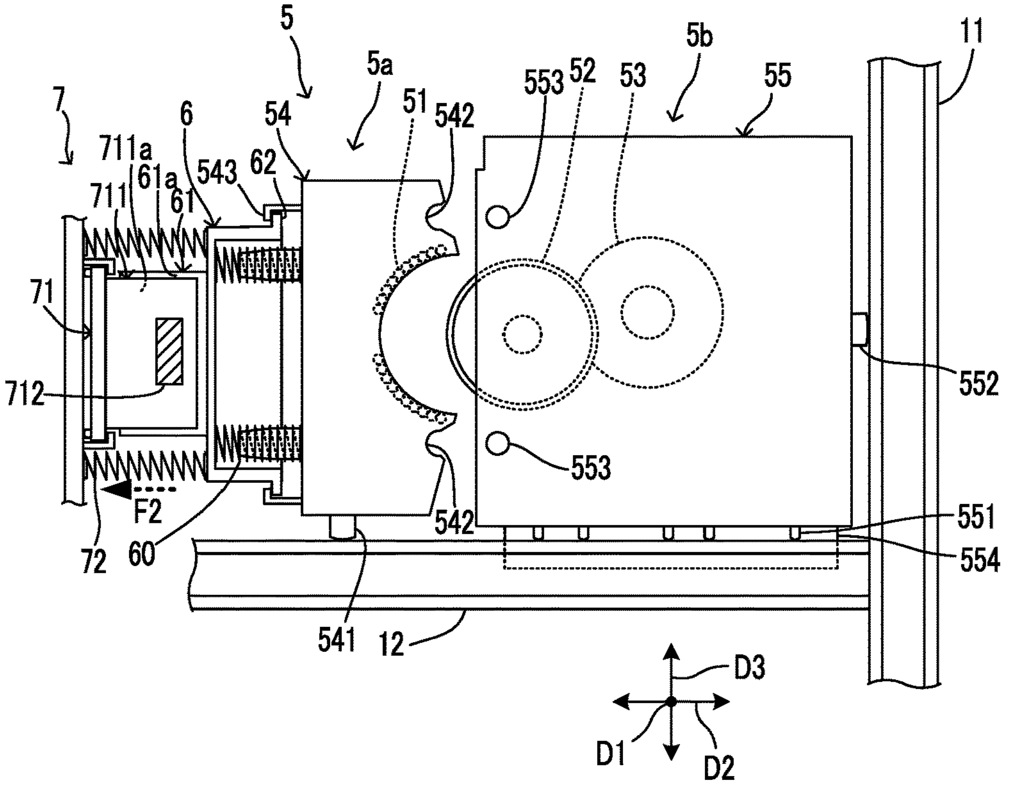
FIG. 5 is a front view of the fixing device and the interlocking mechanism in an evacuated state in the image forming apparatus according to the embodiment.

In the present embodiment, the fixing device 5 is sectioned into a heating unit 5*a* and a fixing unit 5*b* (see FIG. 4 and FIG. 5). The heating unit 5*a* is disposed along a first direction D1 in the main body 1. The fixing unit 5*b* is also disposed along the first direction D1 in the main body 1.

The heating unit 5*a* includes the heater 51 and a first supporting member 54. The fixing unit 5*b* includes the fixing belt 52, the fixing roller 520, the pressure roller 53, and a second supporting member 55.

The first supporting member 54 is a member that supports the heater 51. The second supporting member 55 is a member that supports the fixing belt 52, the fixing roller 520, and the pressure roller 53. The fixing belt 52 is supported by the second supporting member 55 via the fixing roller 520.

Figure 8:
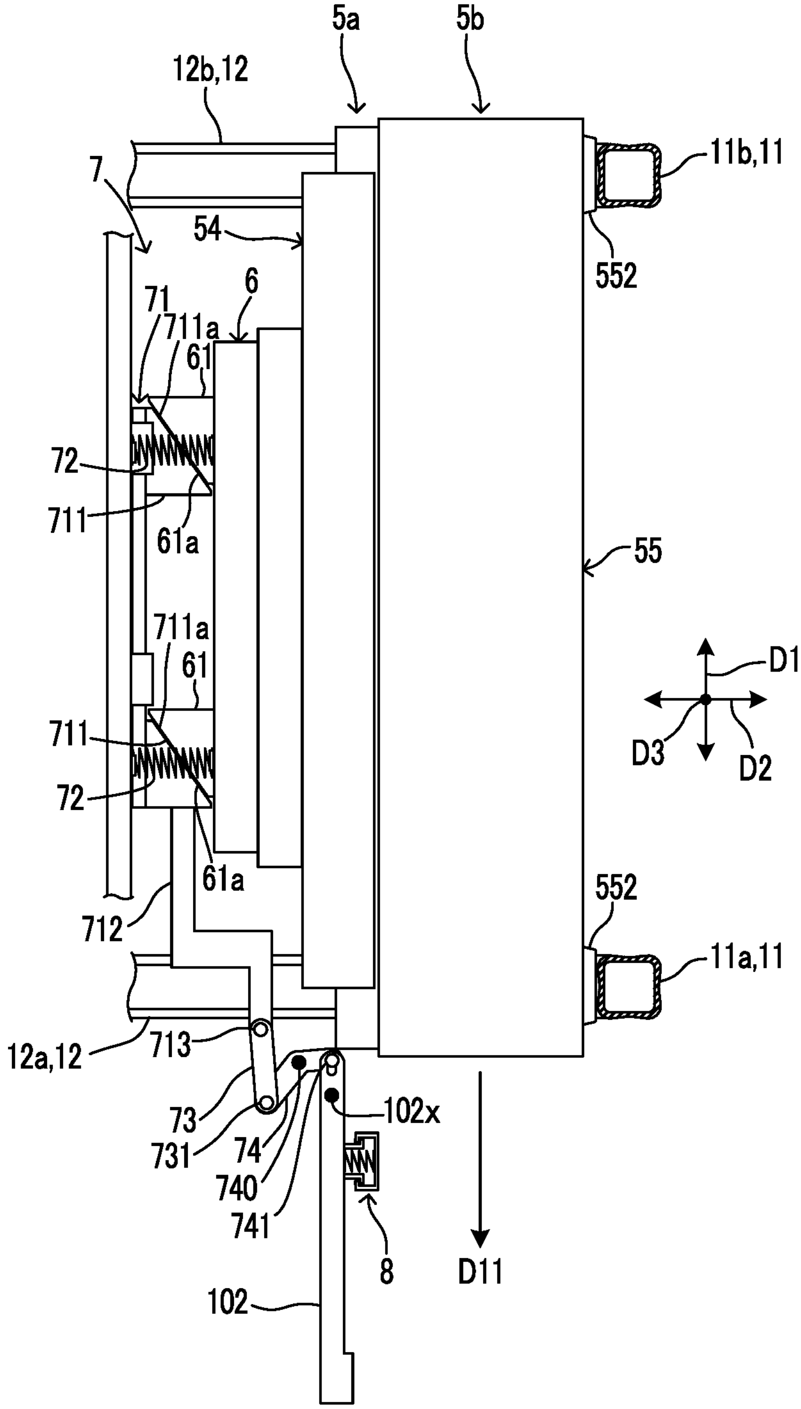
FIG. 8 is a plan view of the fixing device and the interlocking mechanism in the evacuated state in the image forming apparatus according to the embodiment.

By the heating unit 5*a* being moved to a position set apart from the fixing unit 5*b*, the fixing unit 5*b* can be drawn out from the main body 1 (see FIG. 5 and FIG. 8).

Incidentally, it is important to dispose the heater 51 at an appropriate position with respect to the fixing belt 52 for enhancing a heating efficiency of the fixing belt 52 by the heater 51. In a case where a heating device that uses an induction heating system is adopted as the heater 51, a positional accuracy of the heater 51 is particularly important.

Moreover, for enabling the fixing unit 5*b* to be drawn out from the main body 1, a positioning mechanism of the heating unit 5*a* needs to have a proximity function and an evacuation function.

The proximity function is a function of positioning the heating unit 5*a* at a reference position close to the fixing unit 5*b*. The evacuation function is a function of moving the heating unit 5*a* to an evacuation position set apart from the fixing unit 5*b*.

Therefore, for highly accurately disposing the heating unit 5*a* at the reference position, it is required that a mechanical allowance of the positioning mechanism does not adversely affect the positioning of the heating unit 5*a*.

The image forming apparatus 10 has a function of highly accurately positioning the heating unit 5*a* and the fixing unit 5*b* at target positions. Hereinafter, a mechanism for positioning the heating unit 5*a* and the fixing unit 5*b* will be described.

[Mechanism for Positioning Heating Unit 5*a* and Fixing Unit 5*b*]

Figure 3:
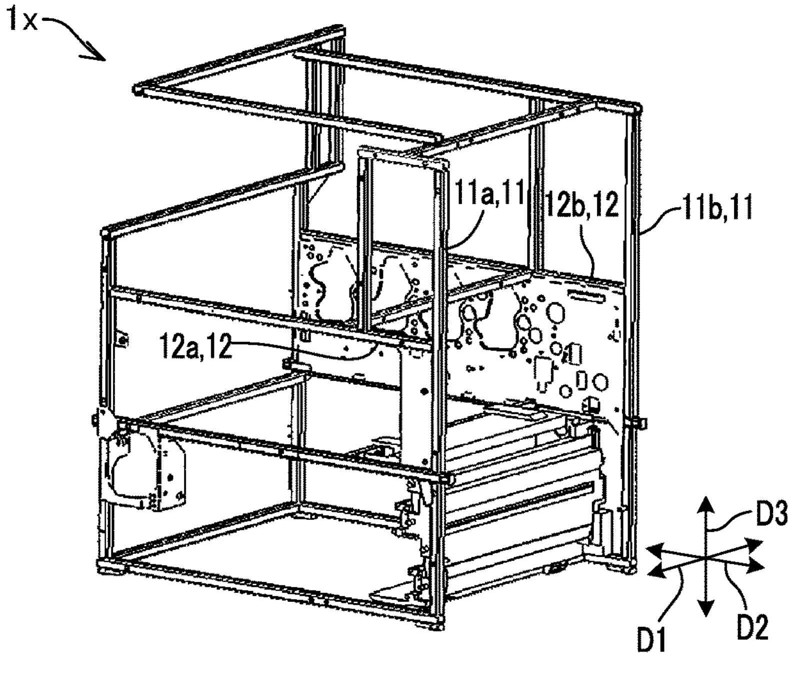
FIG. 3 is a perspective view of a main body frame in the image forming apparatus according to the embodiment.
Figure 9:
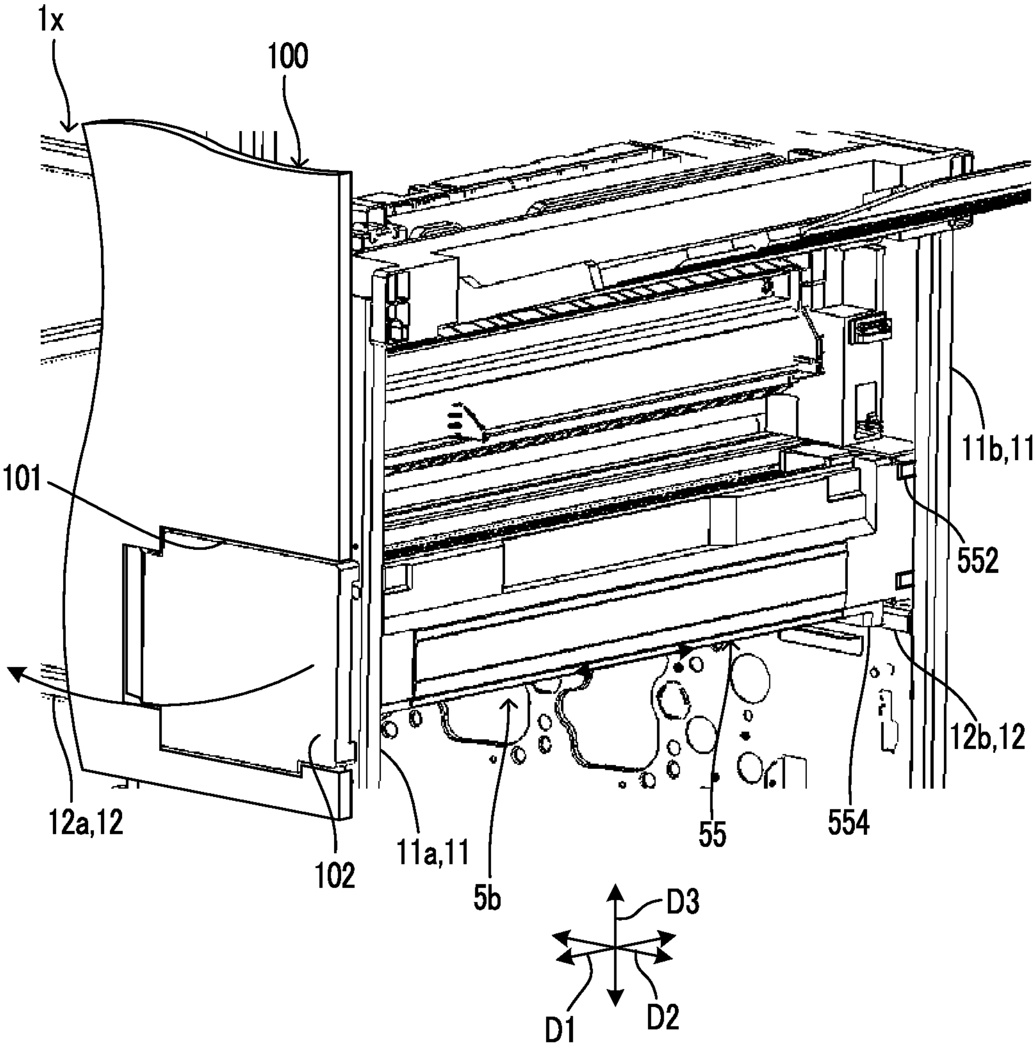
FIG. 9 is a perspective view showing peripheral parts of the fixing unit and a cover member in the image forming apparatus according to the embodiment.

The image forming apparatus 10 includes a main body frame 1*x* and an exterior member 100 (see FIG. 3 and FIG. 9). The main body frame 1*x* forms a framework of the main body 1. The exterior member 100 forms an exterior of the main body 1.

The main body frame 1*x* is constituted by a combination of a plurality of metal pipes (see FIG. 3). The heating unit 5*a* and the fixing unit 5*b* are supported by the main body frame 1*x*. The fixing unit 5*b* is disposed next to the heating unit 5*a*.

The exterior member 100 is attached to the main body frame 1*x* (see FIG. 9). The exterior member 100 forms an exterior of the image forming apparatus 10.

The plurality of metal pipes constituting the main body frame 1*x* include two supporting column portions 11 and two beam portions 12 (see FIG. 3).

The two supporting column portions 11 are formed to extend in a longitudinal direction D3 and are spaced apart from each other in the first direction D1 (see FIG. 3). The longitudinal direction D3 is an up-down direction.

The two supporting column portions 11 are formed next to the fixing unit 5*b* while extending in the longitudinal direction D3 (see FIG. 4 and FIG. 9).

The first direction D1 is a direction along a center line of a rotation of the fixing belt 52 and the pressure roller 53. In the present embodiment, the first direction D1 is a depth direction of the image forming apparatus 10.

The exterior member 100 includes an opening portion 101 and a cover member 102 (see FIG. 9). The opening portion 101 is a part where an opening that opens one end of the fixing unit 5*b* in the first direction D1 is formed.

The cover member 102 is supported by a first supporting shaft 102*x*. Thus, the cover member 102 is rotatable about the first supporting shaft 102*x*. The cover member 102 is rotatable between a closing position at which the opening portion 101 is closed and an opening position at which the opening portion 101 is opened.

Figure 7:
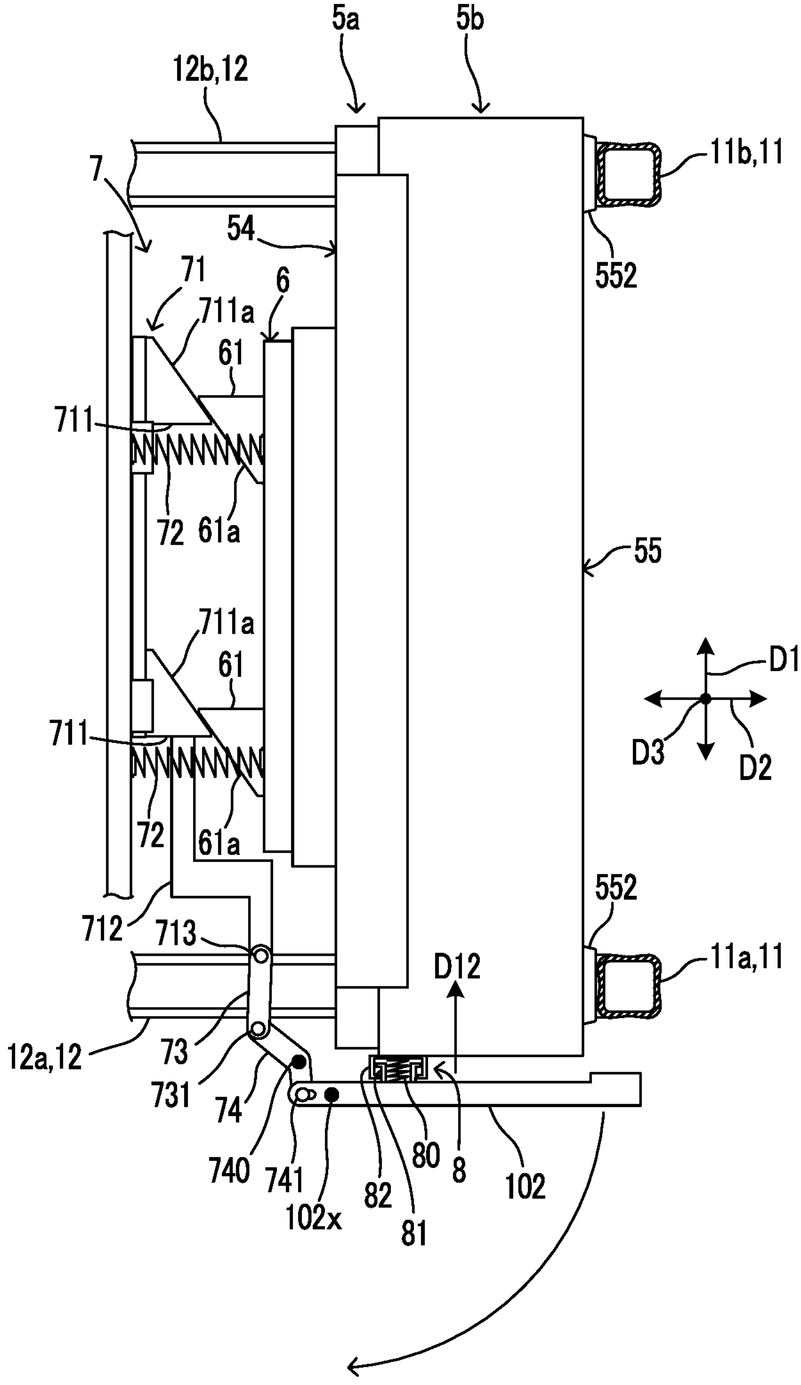
FIG. 7 is a plan view of the fixing device and the interlocking mechanism in the biased state in the image forming apparatus according to the embodiment.

FIG. 4 and FIG. 7 each show the fixing device 5 when the cover member 102 is positioned at the closing position. FIG. 5 and FIG. 8 each show the fixing device 5 when the cover member 102 is positioned at the opening position.

When the cover member 102 is positioned at the closing position, the cover member 102 is retained at the closing position by a lock mechanism (not shown). By releasing the lock by the lock mechanism, the cover member 102 can rotate from the closing position to the opening position.

The two supporting column portions 11 include a first supporting column portion 11*a* disposed on a front surface side of the image forming apparatus 10 and a second supporting column portion 11*b* disposed on a back surface side of the image forming apparatus 10 (see FIG. 3).

The two beam portions 12 are formed to extend in a lateral direction below the heating unit 5*a* and the fixing unit 5*b*, and are spaced apart from each other in the first direction D1 (see FIG. 3 and FIG. 4). The lateral direction is a width direction of the image forming apparatus 10.

The two beam portions 12 are respectively connected to the two supporting column portions 11 (see FIG. 3). For example, the two beam portions 12 are respectively connected to the two supporting column portions 11 by welding.

The two beam portions 12 include a first beam portion 12*a* disposed on the front surface side of the image forming apparatus 10 and a second beam portion 12*b* disposed on the back surface side of the image forming apparatus 10 (see FIG. 3).

The fixing unit 5*b* is disposed between the heating unit 5*a* and the two supporting column portions 11 (see FIG. 3).

The first supporting member 54 of the heating unit 5*a* is placed on the two beam portions 12 while being bridged between the two beam portions 12. Similarly, the second supporting member 55 of the fixing unit 5*b* is placed on the two beam portions 12 while being bridged between the two beam portions 12.

In other words, neither the heating unit 5*a* nor the fixing unit 5*b* is fixed to the main body frame 1*x* by a fixture such as a screw.

The heating unit 5*a* and the fixing unit 5*b* are placed on the two beam portions 12 in a state where longitudinal directions thereof are set along the first direction D1 (see FIG. 7 and FIG. 8).

The heating unit 5*a* and the fixing unit 5*b* are arranged next to each other in a second direction D2. In other words, the second direction D2 is an array direction of the heating unit 5*a* and the fixing unit 5*b*. The second direction D2 is a direction that intersects with the first direction D1.

The image forming apparatus 10 further includes an action member 6, compression springs 60, and an interlocking mechanism 7 (see FIG. 4, FIG. 5, FIG. 7, and FIG. 8). The action member 6 and the compression springs 60 are arranged inside the main body 1.

The action member 6 is supported while being movable between a first position and a second position. The action member 6 is movable along the second direction D2. FIG. 4 and FIG. 7 each show a state where the action member 6 is at the first position. FIG. 5 and FIG. 8 each show a state where the action member 6 is at the second position.

The action member 6 and the heating unit 5*a* sandwich the compression springs 60 when the action member 6 is at the first position (see FIG. 4). The second position is a position farther away from the fixing unit 5*b* than the first position (see FIG. 5).

The compression springs 60 are each an elastic member. The compression springs 60 are arranged on a side opposite to the fixing unit 5*b* side from the heating unit 5*a* in the main body 1 (see FIG. 4 and FIG. 5). For example, the compression springs 60 are respectively supported by protrusion portions 544 provided in the first supporting member 54.

When the action member 6 is at the first position, the compression springs 60 bias the first supporting member 54 toward the second supporting member 55 by an elastic force (see FIG. 4). The compression springs 60 are an example of a unit bias member.

A bias force F1 of the compression springs 60 with respect to the first supporting member 54 is larger than a static frictional force of the heating unit 5*a* and the fixing unit 5*b* with respect to the two beam portions 12 (see FIG. 4).

The first supporting member 54 includes one or more ribs 541 that come into contact with upper surfaces of the two beam portions 12. Similarly, the second supporting member 55 includes a plurality of ribs 551 that come into contact with the upper surfaces of the two beam portions 12. The ribs 541 of the first supporting member 54 and the ribs 551 of the second supporting member 55 are provided for reducing the static frictional force.

By biasing the first supporting member 54, the compression springs 60 cause the first supporting member 54 to come into contact with the second supporting member 55. Also by biasing the first supporting member 54, the compression springs 60 cause the second supporting member 55 to come into contact with the two supporting column portions 11. In other words, the compression springs 60 bias the second supporting member 55 via the first supporting member 54.

The first supporting member 54 includes a plurality of first fitting portions 542 having a concave shape opened in a lateral direction (see FIG. 4 and FIG. 5). The first supporting member 54 includes four first fitting portions 542 formed to be spaced apart from one another in the first direction D1 and the longitudinal direction D3.

The second supporting member 55 includes a plurality of second fitting portions 553 having a convex shape, that can respectively be fit into the plurality of first fitting portions 542. The second supporting member 55 includes four second fitting portions 553 respectively corresponding to the four first fitting portions 542.

By the compression springs 60 biasing the first supporting member 54, inner surfaces of the concave shape portions of the four first fitting portions 542 respectively come into contact with the four second fitting portions 553 (see FIG. 4).

In addition, by the second fitting portions 553 fitting into the first fitting portions 542, a relative movement of the first supporting member 54 and the second supporting member 55 in the longitudinal direction D3 is restricted.

It is noted that the second supporting member 55 may include the first fitting portions 542, and the first supporting member 54 may include the second fitting portions 553.

Figure 6:
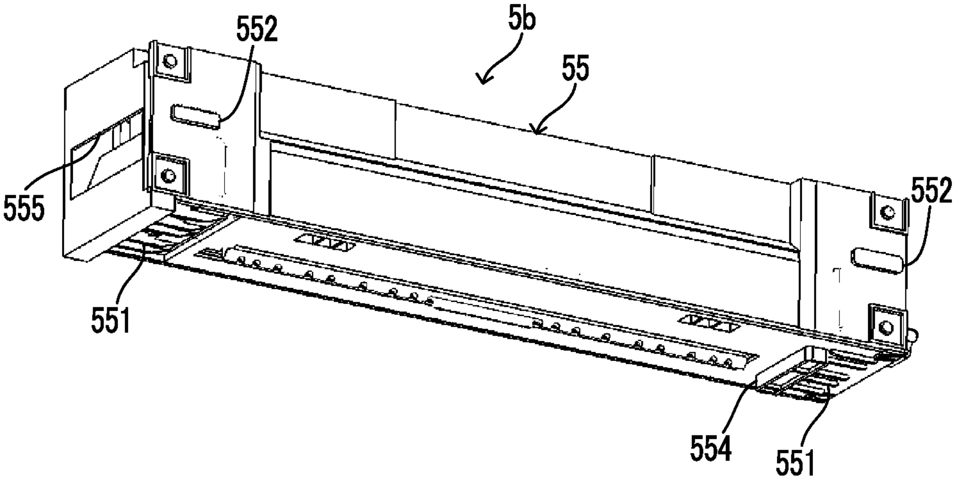
FIG. 6 is a perspective view of a fixing unit in the image forming apparatus according to the embodiment.

Moreover, the second supporting member 55 includes a plurality of column contact portions 552 protruding toward the two supporting column portions 11 (see FIG. 4 and FIG. 6). The plurality of column contact portions 552 respectively come into contact with side surfaces of the two supporting column portions 11.

By operating in conjunction with the movement of the cover member 102, the interlocking mechanism 7 causes the action member 6 to move along the second direction D2. The cover member 102 also serves as an operation portion that is capable of moving by being operated.

By operating in conjunction with the movement of the cover member 102, the interlocking mechanism 7 causes the action member 6 to move from one of the first position and the second position to the other one of the first position and the second position. The cover member 102 and the interlocking mechanism 7 are an example of a movement mechanism.

When the cover member 102 moves from the closing position to the opening position, the interlocking mechanism 7 causes the action member 6 to move from the first position (FIG. 4) to the second position (FIG. 5).

Further, when the cover member 102 moves from the opening position to the closing position, the interlocking mechanism 7 causes the action member 6 to move from the second position (FIG. 5) to the first position (FIG. 4).

When the action member 6 moves from the first position to the second position, the heating unit 5*a* moves from the reference position to the evacuation position in conjunction with the action member 6 (see FIG. 4 and FIG. 5).

When the action member 6 moves from the second position to the first position, the heating unit 5*a* moves from the evacuation position to the reference position in conjunction with the action member 6 (see FIG. 4 and FIG. 5).

FIG. 4 and FIG. 7 each show a state where the heating unit 5*a* is at the reference position. FIG. 5 and FIG. 8 each show a state where the heating unit 5*a* is at the evacuation position.

The reference position is a position of the heating unit 5*a* when the heating unit 5*a* comes into contact with the fixing unit 5*b* (see FIG. 4 and FIG. 7).

When the heating unit 5*a* is at the reference position, the four first fitting portions 542 of the heating unit 5*a* come into contact with the four second fitting portions 553 of the fixing unit 5*b*.

The evacuation position is a position of the heating unit 5*a* when the heating unit 5*a* is set apart from the fixing unit 5*b* (see FIG. 5 and FIG. 8).

When the heating unit 5*a* moves from the reference position to the evacuation position, the four first fitting portions 542 are set apart from the four second fitting portions 553 (see FIG. 5).

It is noted that the heating unit 5*a* being positioned at the reference position is synonymous with the first supporting member 54 being positioned at the reference position. In addition, the heating unit 5*a* being positioned at the evacuation position is synonymous with the first supporting member 54 being positioned at the evacuation position.

When the heating unit 5*a* is positioned at the evacuation position, the fixing unit 5*b* can be drawn out from the main body 1 in a detachment direction D11 (see FIG. 8). The fixing unit 5*b* includes a handle portion 555 that is grabbed by a hand when drawn out from the main body 1 (see FIG. 6). The fixing unit 5*b* is drawn out from the main body 1 without coming into contact with the heating unit 5*a*. The detachment direction D11 is a direction along the first direction D1.

When the fixing unit 5*b* is drawn out from the main body frame 1*x*, the fixing unit 5*b* is capable of passing through the opening portion 101 of the exterior member 100.

When the heating unit 5*a* moves from the evacuation position to the reference position, the four second fitting portions 553 fit into the four first fitting portions 542 (see FIG. 4). Therefore, when the heating unit 5*a* is at the reference position, the four first fitting portions 542 of the heating unit 5*a* are respectively in contact with the four second fitting portions 553 of the fixing unit 5*b*.

The first supporting member 54 of the heating unit 5*a* includes to-be-engaged portions 543 that engage with a part of the action member 6 (see FIG. 4 and FIG. 5).

The action member 6 includes engagement portions 62 that are capable of engaging with the to-be-engaged portions 543 of the first supporting member 54 (see FIG. 4 and FIG. 5). While the action member 6 moves from the first position to the second position, the engagement portions 62 engage with the to-be-engaged portions 543 (see FIG. 5).

When the action member 6 moves from the first position to the second position, the heating unit 5*a* engages with the engagement portions 62. Thus, the heating unit 5*a* moves from the reference position to the evacuation position by a force received from the action member 6 via the engagement portions 62 (see FIG. 5).

On the other hand, when the action member 6 moves from the second position to the first position along the second direction D2, the engagement between the engagement portions 62 and the to-be-engaged portions 543 is released.

When the action member 6 further moves toward the first position after the engagement between the engagement portions 62 and the to-be-engaged portions 543 is released, the action member 6 biases the first supporting member 54 of the heating unit 5*a* toward the fixing unit 5*b* via the compression springs 60 (see FIG. 4).

When the action member 6 moves from the second position to the first position, the heating unit 5*a* moves from the evacuation position to the reference position by an elastic force received from the action member 6 via the compression springs 60 (see FIG. 4).

When the action member 6 is at the first position, the four first fitting portions 542 of the heating unit 5*a* come into contact with the four second fitting portions 553 of the fixing unit 5*b* by a bias force received from the compression springs 60 (see FIG. 4).

In the present embodiment, inner surfaces of the four first fitting portions 542 are an example of a contact portion that comes into contact with the fixing unit 5*b* by a bias force received from the compression springs 60. In other words, the four first fitting portions 542 include the contact portion.

By being sandwiched between the compression springs 60 and the two supporting column portions 11, the heating unit 5*a* and the fixing unit 5*b* are positioned in the second direction D2. By the four first fitting portions 542 coming into contact with the fixing unit 5*b*, the heating unit 5*a* is positioned at the reference position.

Moreover, the heating unit 5*a* is biased toward the fixing unit 5*b* by an elastic force of the compression springs 60. Thus, a situation where the mechanical allowance of the interlocking mechanism 7 adversely affects the positioning of the heating unit 5*a* is avoided.

In the present embodiment, the interlocking mechanism 7 includes an interlocking member 71, tension springs 72, a first link member 73, and a second link member 74 (see FIG. 7 and FIG. 8).

The interlocking member 71 is supported while being movable between a restriction position and a release position along the first direction D1 (see FIG. 7 and FIG. 8). FIG. 7 shows a state where the interlocking member 71 is at the restriction position. FIG. 8 shows a state where the interlocking member 71 is at the release position.

Further, the action member 6 includes first protrusion portions 61 protruding toward a side opposite to the heating unit 5*a* side (see FIG. 7 and FIG. 8). The interlocking member 71 includes second protrusion portions 711 protruding toward the action member 6 side (see FIG. 7 and FIG. 8).

The tension springs 72 are elastic members that bias the action member 6 in a direction in which a distance from the fixing unit 5*b* increases. The tension springs 72 are an example of an evacuation bias member.

A bias force F2 of the tension springs 72 with respect to the action member 6 is larger than the static frictional force of the heating unit 5*a* with respect to the two beam portions 12 (see FIG. 5).

The first link member 73 is connected to the interlocking member 71 by a first connection shaft 713. In the present embodiment, the interlocking member 71 includes an arm portion 712 that is formed to extend toward the cover member 102. The first connection shaft 713 connects the arm portion 712 and the first link member 73.

The second link member 74 is connected to the first link member 73 by a second connection shaft 731. In addition, the second link member 74 is connected to the cover member 102 by a third connection shaft 741.

The second link member 74 is supported by a second supporting shaft 740. The second link member 74 is rotatable about the second supporting shaft 740.

The first link member 73, the first connection shaft 713, the second connection shaft 731, the second link member 74, and the third connection shaft 741 constitute a link mechanism which converts a rotational motion of the cover member 102 into a linear motion of the interlocking member 71.

By an action of the link mechanism, the interlocking member 71 moves from the restriction position to the release position in conjunction with the movement of the cover member 102 from the closing position to the opening position. Similarly, by the action of the link mechanism, the interlocking member 71 moves from the release position to the restriction position in conjunction with the movement of the cover member 102 from the opening position to the closing position.

The first protrusion portions 61 each include a first tilted side surface 61*a* formed obliquely from a base portion toward a vertex portion thereof (see FIG. 7 and FIG. 8). Similarly, the second protrusion portions 711 each include a second tilted side surface 711*a* formed obliquely from a base portion toward a vertex portion thereof (see FIG. 7 and FIG. 8).

When the interlocking member 71 moves from the restriction position to the release position, the second tilted side surface 711*a* slides on the first tilted side surface 61*a* in a downward direction. The downward direction is a direction that is directed from the vertex portion of the first protrusion portion 61 toward the base portion.

By the second tilted side surface 711*a* sliding on the first tilted side surface 61*a* in the downward direction, the action member 6 moves from the first position to the second position by a bias force of the tension springs 72 (see FIG. 8).

On the other hand, when the interlocking member 71 moves from the release position to the restriction position, the second tilted side surface 711*a* slides on the first tilted side surface 61*a* in an upward direction. The upward direction is a direction that is directed from the base portion of the first protrusion portion 61 toward the vertex portion.

By the second tilted side surface 711*a* sliding on the first tilted side surface 61*a* in the upward direction, the action member 6 moves from the second position to the first position by a force received from the second protrusion portions 711 against the bias force of the tension springs 72 (see FIG. 7).

In the present embodiment, the second tilted side surface 711*a* of each of the second protrusion portions 711 is an example of a slide portion that comes into contact with the first tilted side surface 61*a*.

It is noted that the first tilted side surface 61*a* is an example of a slide portion that comes into contact with the second tilted side surface 711*a*.

In other words, when the interlocking member 71 moves from the restriction position to the release position, the first tilted side surface 61*a* slides on the second tilted side surface 711*a* in the downward direction. The downward direction in this case is a direction that is directed from the vertex portion of the second protrusion portion 711 toward the base portion.

By the first tilted side surface 61*a* sliding on the second tilted side surface 711*a* in the downward direction, the action member 6 moves from the first position to the second position by the bias force of the tension springs 72 (see FIG. 8).

On the other hand, when the interlocking member 71 moves from the release position to the restriction position, the first tilted side surface 61*a* slides on the second tilted side surface 711*a* in the upward direction. The upward direction in this case is a direction that is directed from the base portion of the second protrusion portion 711 toward the vertex portion.

By the first tilted side surface 61*a* sliding on the second tilted side surface 711*a* in the upward direction, the action member 6 moves from the second position to the first position by a force received from the second protrusion portions 711 against the bias force of the tension springs 72 (see FIG. 7).

It is noted that the interlocking mechanism 7 may include a gear mechanism such as a rack-and-pinion mechanism. Also in this case, the interlocking mechanism 7 converts the rotational motion of the cover member 102 into the linear motion of the action member 6 along the second direction D2.

Moreover, by being placed on the two beam portions 12, the heating unit 5*a* and the fixing unit 5*b* are positioned in the longitudinal direction D3. Weights of the heating unit 5*a* and the fixing unit 5*b* restrict the upward movement of the heating unit 5*a* and the fixing unit 5*b*.

Figure 10:
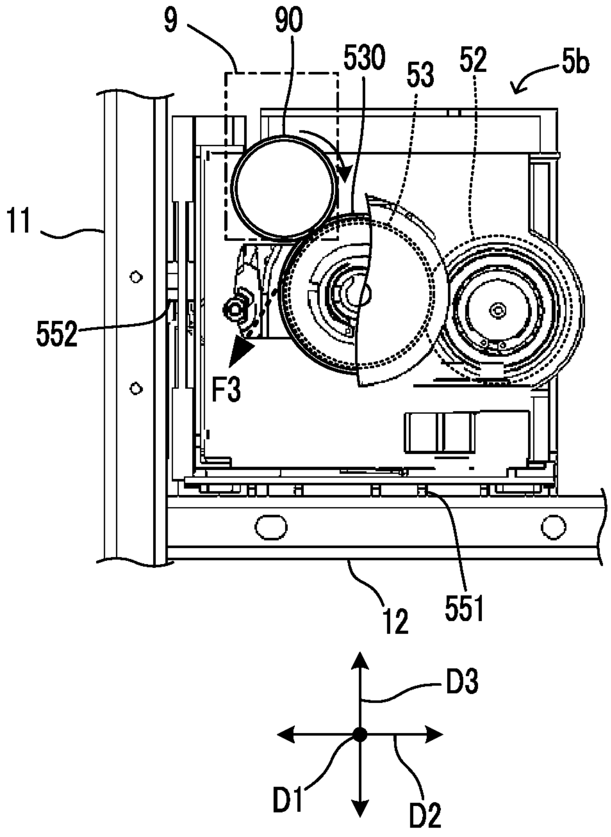
FIG. 10 is a diagram showing a back surface of the fixing unit and a drive mechanism in the image forming apparatus according to the embodiment.

As shown in FIG. 10, the image forming apparatus 10 includes a drive mechanism 9 including a drive gear 90. The drive mechanism 9 includes a motor (not shown). The drive mechanism 9 transmits a rotational force to the fixing unit 5*b* via the drive gear 90.

The fixing unit 5*b* includes a driven gear 530 that intermeshes with the drive gear 90. The driven gear 530 transmits the rotational force received from the drive gear 90 to the fixing roller 520. Thus, the fixing belt 52 rotates. In other words, the driven gear 530 transmits the rotational force to the fixing belt 52 via the fixing roller 520.

The pressure roller 53 rotates in conjunction with the rotating fixing belt 52. It is noted that the driven gear 530 is also a gear that transmits the rotational force to the pressure roller 53 via the fixing roller 520 and the fixing belt 52.

A direction of a pressure F3 that the teeth of the driven gear 530 receive from the teeth of the drive gear 90 is a downward oblique direction on the two supporting column portions 11 side (see FIG. 10). Therefore, the pressure F3 that the teeth of the driven gear 530 receive from the teeth of the drive gear 90 acts as a force that biases the fixing unit 5*b* toward the two supporting column portions 11 and the two beam portions 12.

By the pressure F3 received from the drive gear 90, the fixing unit 5*b* is positioned more securely in the second direction D2 and the longitudinal direction D3. Further, by the actions of the first fitting portions 542 and the second fitting portions 553, the heating unit 5*a* is also positioned more securely in the longitudinal direction D3 together with the fixing unit 5*b*.

In the present embodiment, the drive mechanism 9 also serves as a lower bias mechanism that downwardly biases the fixing unit 5*b*.

Moreover, the image forming apparatus 10 further includes a cover bias mechanism 8 attached to an inner surface of the cover member 102 (see FIG. 7 and FIG. 8). Further, the second supporting member 55 of the fixing unit 5*b* includes a beam contact portion 554 protruding downwardly from the lower surface thereof (see FIG. 4, FIG. 5, FIG. 6, and FIG. 9).

The cover bias mechanism 8 includes a third spring 80, a spring case 81, and a cap portion 82 (see FIG. 7).

The spring case 81 houses the third spring 80. The cap portion 82 is movably attached to the spring case 81. The third spring 80 is an example of an elastic fixing unit bias member.

When the cover member 102 is at the closing position, the third spring 80 is sandwiched between the cover member 102 and the second supporting member 55 of the fixing unit 5*b*. In the present embodiment, the third spring 80 and the cap portion 82 are sandwiched between the cover member 102 and the second supporting member 55.

By being sandwiched between the cover member 102 and the second supporting member 55, the third spring 80 biases the second supporting member 55 in an attachment direction D12 by an elastic force (see FIG. 7). The attachment direction D12 is a direction opposite to the detachment direction D11.

Further, the beam contact portion 554 comes into contact with one of the side surfaces of the two beam portions 12 by a force that the second supporting member 55 receives from the third spring 80 when the cover member 102 is at the closing position. In the present embodiment, the beam contact portion 554 comes into contact with the side surface of the second beam portion 12*b*.

By the actions of the third spring 80 and the beam contact portion 554, the fixing unit 5*b* is positioned in the first direction D1.

It is noted that the cover bias mechanism 8 may be attached to the second supporting member 55 of the fixing unit 5*b*.

By adopting the image forming apparatus 10, the positioning mechanism for arranging the heating unit 5*a* and the fixing unit 5*b* at target positions is realized by a simple mechanism.

Application Example

Next, an application example of the image forming apparatus 10 will be described.

In the present application example, the arm portion 712 of the interlocking member 71 includes the operation portion in the movement mechanism.

In the present application example, the interlocking mechanism 7 does not include the first link member 73, the second link member 74, the first connection shaft 713, the second connection shaft 731, the second supporting shaft 740, and the third connection shaft 741.

In the present application example, by the arm portion 712 being pulled in the detachment direction D11, the interlocking member 71 moves from the restriction position to the release position. Moreover, by the arm portion 712 being pressed in the attachment direction D12, the interlocking member 71 moves from the release position to the restriction position.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

a heating unit which includes a heater and is disposed with a longitudinal direction of the heating unit along a specific direction in a main body;

a fixing unit which includes a fixing member that is heated by the heater and a pressure member that biases a sheet toward the fixing member, and is disposed on one side of the heating unit with a longitudinal direction of the fixing unit along the specific direction in the main body;

a unit bias member which is an elastic member disposed on another side of the heating unit in the main body;

an action member which is disposed in the main body and is supported while being movable between a first position at which the unit bias member is sandwiched between the action member and the heating unit and a second position farther away from the fixing unit than the first position; and a movement mechanism which includes an operation portion capable of moving by being operated, and operates in conjunction with a movement of the operation portion to cause the action member to move from one of the first position and the second position to another one of the first position and the second position, wherein the heating unit includes a contact portion which comes into contact with the fixing unit by a bias force received from the unit bias member when the action member is at the first position, the contact portion comes into contact with the fixing unit to position the heating unit at a reference position, the action member includes an engagement portion which engages with a part of the heating unit when the action member moves from the first position to the second position, when the action member moves from the first position to the second position, the heating unit engages with the engagement portion to move from the reference position to an evacuation position farther away from the fixing unit than the reference position, and when the heating unit is at the evacuation position, the fixing unit can be drawn out from the main body along the specific direction.

2. The image forming apparatus according to claim 1, wherein a first unit that is one of the heating unit and the fixing unit includes a first fitting portion having a concave shape opened toward a second unit that is another one of the heating unit and the fixing unit, the second unit includes a second fitting portion having a convex shape which fits into a concave portion of the first fitting portion when the heating unit moves from the evacuation position to the reference position, the first fitting portion or the second fitting portion includes the contact portion, and the second fitting portion fits into the first fitting portion to restrict a relative movement of the heating unit and the fixing unit in a longitudinal direction that intersects the specific direction and a movement direction of the heating unit.

3. The image forming apparatus according to claim 1, wherein the action member includes a first protrusion portion protruding away from the heating unit, the movement mechanism includes an evacuation bias member which is an elastic member that biases the action member in a direction in which a distance from the fixing unit increases, and an interlocking member which is supported while being movable between a restriction position and a release position along the specific direction in conjunction with the movement of the operation portion, the interlocking member includes a second protrusion portion protruding toward a side of the action member, one of the first protrusion portion and the second protrusion portion includes a tilted side surface formed obliquely from a base portion toward a vertex portion, another one of the first protrusion portion and the second protrusion portion includes a slide portion that comes into contact with the tilted side surface, when the interlocking member moves from the restriction position to the release position, the slide portion slides on the tilted side surface in a downward direction from the vertex portion toward the base portion, and the action member moves from the first position to the second position by a bias force of the evacuation bias member, and when the interlocking member moves from the release position to the restriction position, the slide portion slides on the tilted side surface in an upward direction from the base portion toward the vertex portion, and the action member moves from the second position to the first position by a force received from the second protrusion portion against the bias force of the evacuation bias member.

4. The image forming apparatus according to claim 1, further comprising an exterior member forming an exterior of the main body, wherein the exterior member includes an opening portion through which the fixing unit drawn out from the main body is capable of passing, and a cover member rotatable between a closing position at which the opening portion is closed and an opening position at which the opening portion is opened, the cover member also serves as the operation portion, the movement mechanism includes an interlocking mechanism which operates in conjunction with a movement of the cover member, the interlocking mechanism causes the action member to move from the first position to the second position when the cover member moves from the closing position to the opening position, and the interlocking mechanism further causes the action member to move from the second position to the first position when the cover member moves from the opening position to the closing position.

5. The image forming apparatus according to claim 1, wherein the heater is a heating device which uses an induction heating system.

* * * * *